(12) United States Patent
Arai (10) Patent No.: US 8,974,223 B2
(45) Date of Patent: Mar. 10, 2015

(54) INJECTION FOAMING MOLD, METHOD OF PRODUCING FOAMED PLASTIC PRODUCT, AND FOAMED PLASTIC PRODUCT

(75) Inventor: Takashi Arai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 13/290,526

(22) Filed: Nov. 7, 2011

(65) Prior Publication Data

US 2012/0128957 A1 May 24, 2012

(30) Foreign Application Priority Data

Nov. 24, 2010 (JP) ................................. 2010-261623

(51) Int. Cl.
*B29C 35/00* (2006.01)
*B29C 44/58* (2006.01)
*B29C 44/04* (2006.01)

(52) U.S. Cl.
CPC ........... *B29C 44/586* (2013.01); *B29C 44/0415* (2013.01)
USPC ....................................... 425/577; 264/328.7

(58) Field of Classification Search
USPC ....................................... 264/328.7; 425/577
See application file for complete search history.

(56) References Cited

U.S. PATENT DOCUMENTS

| | | | |
|---|---|---|---|
| 4,073,844 A | 2/1978 | Wada et al. | |
| 4,091,057 A * | 5/1978 | Weber | 264/2.2 |
| 4,473,665 A | 9/1984 | Martini-Vvedensky et al. | |
| 6,511,621 B2 * | 1/2003 | Suzuki et al. | 264/45.3 |
| 7,309,227 B2 * | 12/2007 | Pierson et al. | 425/441 |
| 2007/0023945 A1 * | 2/2007 | Valentinsson | 264/45.5 |
| 2007/0145769 A1 * | 6/2007 | Nakashita et al. | 296/146.5 |
| 2009/0057949 A1 * | 3/2009 | Izumo | 264/274 |

FOREIGN PATENT DOCUMENTS

| | | |
|---|---|---|
| CN | 1364688 A | 8/2002 |
| JP | 39-022213 B | 10/1964 |
| JP | 2003-170762 A | 6/2003 |
| JP | 2003-251669 A | 9/2003 |
| JP | 2007-007941 A | 1/2007 |
| JP | 2009-061592 A | 3/2009 |

(Continued)

OTHER PUBLICATIONS

Extended European Search Report in European Application No. 11009064.4 (Apr. 12, 2012).
First Office Action in Chinese Application No. 201110370496.8 (dated Nov. 5, 2013).

(Continued)

*Primary Examiner* — Joseph S Del Sole
*Assistant Examiner* — David N Brown, II
(74) *Attorney, Agent, or Firm* — Fitzpatrick, Cella, Harper & Scinto (57) ABSTRACT

Provided is an injection foaming mold capable of preventing, when formed resin molding is performed by a partial core back, degradation of an outer appearance and component precision, and occurrence of swelling when a portion that is not subjected to the core back is taken out of a die. The injection foaming mold includes at least: a fixed core that avoids moving; and a movable core that performs the core back. The injection foaming mold further includes a capacity change shape portion, which is formed in a region in which a capacity in the die is changed smoothly and continuously from the fixed core side to the movable core side, the capacity change shape portion being formed at a boundary between the fixed core and the movable core.

6 Claims, 10 Drawing Sheets

(56) References Cited

FOREIGN PATENT DOCUMENTS

| | | |
|---|---|---|
| JP | 2009-066941 A | 4/2009 |
| JP | 2009-078471 A | 4/2009 |

OTHER PUBLICATIONS

Second Office Action in Chinese Application No. 201110370496.8 (dated Jun. 10, 2014).

* cited by examiner

PRIOR ART

FIG. 10

PRIOR ART

FIG. 11

INJECTION FOAMING MOLD, METHOD OF PRODUCING FOAMED PLASTIC PRODUCT, AND FOAMED PLASTIC PRODUCT

BACKGROUND OF THE INVENTION

1. Field of the Invention

The present invention relates to an injection foaming mold, a method of producing a foamed plastic product, and a foamed plastic product, and more particularly, to an injection foaming mold to be used for a core back, a method of producing a foamed plastic product, and a formed resin molding product.

2. Description of the Related Art

Conventionally, a foamable resin is produced by introducing a foaming agent such as butane gas, methane gas, water, nitrogen, or carbon dioxide to a resin or by melt-kneading the resin and the foaming agent mechanically, or by inducing a chemical reaction therebetween.

Then, the foamable resin thus produced is injected or extruded to a die by an injection molding machine or an extrusion molding machine to produce a foamed plastic product with a desired shape and a foaming ratio.

Further, in recent years, as a method of producing a foamed plastic product, there has been known a method of obtaining a formed resin molding product containing a large number of cells with a small (micro size) foaming diameter by introducing nitrogen or carbon dioxide in a supercritical state to a resin material at high pressure and high temperature, and adjusting the pressure and the temperature (for example, U.S. Pat. No. 4,473,665).

Further, as a method of producing a foamed plastic product, there is known a foam molding method called core back (for example, Japanese Publication No. S39-022213 (of examined patent application)).

According to the method using the core back, after a foamable resin is injected to a die, under a state in which the foamable resin is uncured, the capacity of the die is enlarged to decrease the pressure applied to the resin in an uncured state. Then, gas contained in the resin in an uncured state is formed into cells to increase a foaming ratio.

Further, as a foam molding method using the core back, there is known a molding method in which the core back is performed partially, in addition to a method in which the core back is performed entirely (for example, Japanese Patent Application Laid-Open No. 2003-170762).

The conventional foam molding has a problem in that, when a foaming diameter is increased so as to enhance a foaming ratio as in the case of foam polystyrene used in a packing material, partition walls between foam cells become thin to decrease the strength of a molding product remarkably.

Further, according to the above-mentioned foam molding method using inactive gas in a supercritical state, which is described in U.S. Pat. No. 4,473,665, the decrease in strength of the molding product is small because the cell diameter has a micro size.

However, it is difficult to enhance a foaming ratio, and the reduction in weight by foaming stands at about 10%. Thus, there is a problem in that the economic effect such as the reduction in materials is low.

In contrast, according to the above-mentioned foam molding methods using the core back described in Japanese Publication No. S39-022213 (of examined patent application) and Japanese Patent Application Laid-Open No. 2003-170762, the reduction in weight can be achieved while a foaming ratio is enhanced without decreasing the strength such as stiffness.

However, according to the foam molding method using the core back, particularly in the case of performing the core back partially, a shrinkage ratio varies due to the difference in foaming ratio in the vicinity of a boundary in portions in which the die capacity is enlarged and at which the die capacity is not enlarged, or in portions in which a partial difference in enlargement ratio occurs.

Therefore, there is a problem in that a step difference and deformation similar to a sink are generated, degrading an outer appearance and component precision.

Further, there is a problem in that, after performing the core back, a portion that is not subjected to the core back is swollen when being taken out of the die.

Such swelling is caused because it is necessary to increase a force for foaming so as to enhance the foaming ratio by the core back.

That is, such swelling is caused in such a manner that a portion subjected to the core back is released from a force by the reduction in pressure by performing the core back so as to enhance a foaming ratio, whereas a portion that is not subjected to the core back is not reduced in pressure and a force for foaming remains in that portion as it is.

SUMMARY OF THE INVENTION

In view of the above-mentioned problems, an object of the present invention is to provide an injection foaming mold, a method of producing a foamed plastic product, and a formed resin molding product, which are capable of preventing, when formed resin molding is performed by a partial core back, degradation of an outer appearance and component precision, and occurrence of swelling when a portion that is not subjected to the core back is taken out of a die.

The present invention provides an injection foaming mold to be used for core-back injection molding in which a foamable resin containing a foaming agent is injected into a die in a molten state, and under a state in which the foamable resin is uncured, a capacity in the die is enlarged and a pressure applied to the foamable resin in the uncured state is reduced to accelerate foaming in the die, the injection foaming mold including: a fixed core that avoids moving; and a movable core that performs a core back, in which a capacity change shape portion is formed in a region in which the capacity in the die is changed smoothly and continuously from the fixed core side to the movable core side, and the capacity change shape portion is formed at a boundary between the fixed core and the movable core.

Further, the present invention provides a method of producing a foamed plastic product by core-back injection molding in which a foamable resin containing a foaming agent is injected into a die, and a capacity in the die is enlarged to accelerate foaming, the method including: preparing, as the die, an injection foaming mold including a fixed core that avoids moving, a movable core that performs a core back, and a capacity change shape portion, which is formed in a region in which the capacity in the die is changed smoothly and continuously from the fixed core side to the movable core side, the capacity change shape portion being formed at a boundary between the fixed core and the movable core; previously setting the movable core at a position at which a volume is smaller than a volume of a final molding product, and injecting the foamable resin containing the foaming agent into the die in a molten state; and injecting the foamable resin in the molten state in a predetermined resin amount to keep a pressure, and under a state in which the foamable resin is uncured, moving the movable core to a position at which a final capacity is achieved and reducing the kept pressure to accelerate foaming in the die, to thereby obtain a foamed plastic product.

Further, the present invention provides a foamed plastic product molded by core-back injection molding with the above-mentioned injection foaming mold, the foamed plastic product including: a region with a small thickness and a small cell density; a region with a large thickness and a large cell density; and a region with a thickness and a cell density increasing gradually from the region with a small thickness and a small cell density to the region with a large thickness and a large cell density, the region being provided between the region with a small thickness and a small cell density and the region with a large thickness and a large cell density.

According to the present invention, it is possible to realize the injection foaming mold, the method of producing a foamed plastic product, and the formed resin molding product, which are capable of preventing, when the formed resin molding is performed by the partial core back, the degradation of the outer appearance and component precision, and the occurrence of the swelling when the portion that is not subjected to the core back is taken out of the die.

Further features of the present invention will become apparent from the following description of exemplary embodiments with reference to the attached drawings.

DESCRIPTION OF THE EMBODIMENTS

Figure 1:
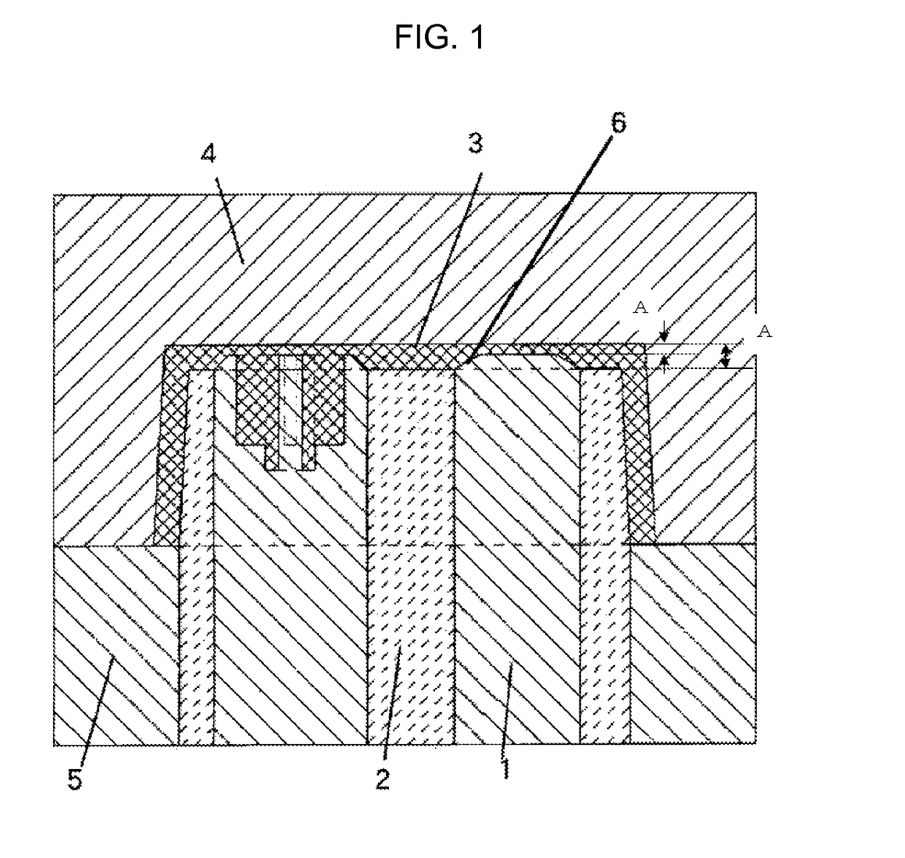
FIG. 1 is a cross-sectional view illustrating a basic configuration of an injection foaming mold according to an embodiment of the present invention.

Now, an embodiment of the present invention is described. FIG. 1 is a view illustrating an example of the embodiment of the present invention. In FIG. 1, a fixed core 1 does not move in a die, and a movable core 2 in which the core moves to perform a core back operation. Further, a foamed plastic product 3 is molded by injecting a resin into a space in the die. A cavity plate 4 is provided, and a core plate 5 contains the fixed core 1 and the movable core 2.

In the injection foaming mold of this embodiment, a foamed resin is molded by performing a partial core back, and hence the fixed core that does not move and the movable core that moves to perform the core back are provided in the injection foaming mold.

A capacity change shape portion is formed, which is formed in a region in which the capacity of the die is changed smoothly and continuously from the fixed core side to the movable core side, at a boundary between the fixed core and the movable core in the die. The region in which the capacity of the die is changed smoothly and continuously refers to, in other words, a region 6 in which the height of a space in the die into which a resin is injected increases continuously from a height A of the fixed core to a height A' of the movable core, and the capacity change shape portion is, in other words, a height change shape portion.

Further, in the die, the movable core is previously set at a position at which the volume is smaller than that of a final molding product. Into the die, a foamable resin to which nitrogen or carbon dioxide in a supercritical state is introduced is injected in a molten state in a predetermined resin amount, and thereafter, the movable core is moved to a position at which a final capacity is achieved to obtain a foamed plastic product in a desired shape.

At this time, the movable core is moved after the elapse of a predetermined period of time from the injection of the resin into the die, depending upon the kind of the resin and the shape of a component, so as to obtain a foamed plastic product in a desired shape.

The configuration of the capacity change shape portion of this embodiment can also be applied to a lifter or a slide that is not operated during the injection of the resin and the operation of the movable core and that is operated when a component is taken out. That is, even in the lifter or the like, the capacity change shape portion in which the capacity is changed smoothly toward the movable core can be formed at a boundary between the fixed core and the movable core.

Further, the operation control of the movable core can be determined in terms of the kind of the resin, a desired foaming ratio, required strength, and a surface property, and the operation timing and speed can be controlled in multiple stages.

Further, the capacity change shape portion at the boundary between the fixed core and the movable core can be determined depending upon the kind of a material, the thickness of the fixed core portion, the core-back stroke, the capacity change length, the capacity change ratio (angle), etc.

In general, when the foamable resin to which nitrogen or carbon dioxide in a supercritical state is introduced is injected into the die having the fixed core and the movable core, a foamed structure formed at the time of injection is retained in the fixed core portion.

However, in the movable core portion, more secondary foam cells are formed and primary foam cells grow due to the foaming expansion caused by the rapid reduction in pressure during operation.

Consequently, the foamed structures are different between the fixed portion and the movable portion in terms of the number of cells per unit volume and an average cell diameter.

Such a difference in foamed structure causes the difference in shrinkage ratio when the resin is cured by cooling in the die.

This is also known as the fact that, in a portion in which a sink occurs in non-foam molding, a sink does not occur in foam molding.

Due to such a difference in contraction, a minute step difference or deformation similar to a sink generally occurs in the vicinity of the boundary between the fixed core portion and the movable core portion, and there arise problems in terms of quality in an outer appearance component having a gloss surface and a component required to have flatness.

In contrast, in the injection foaming mold of this embodiment, when the movable core moves to perform the core back, the capacity change shape portion, in which the capacity is changed smoothly from the fixed core side to the movable core side, is formed at the boundary between the fixed core and the movable core as described above.

Thus, the contraction difference caused by the difference in foamed structure between the fixed core portion and the movable core portion can be changed continuously.

That is, the contraction difference between the fixed core portion and the movable core portion changes continuously, which can prevent a local step difference.

Further, in this embodiment, the force for foaming in the fixed core portion can be alleviated continuously toward the movable core portion.

That is, due to the smooth volume change shape of this embodiment, the pressure for foaming in the fixed core portion is gradually alleviated along with a change in volume toward the movable core side during operation of the movable core, and such an effect can suppress the occurrence of swelling after the resin is taken out of the conventional die.

According to the injection foaming mold to be used in core-back injection molding, a foamed plastic product can be formed, which has a region with a small thickness and a small cell density and a region with a large thickness and a large cell density, and which has a region with a thickness and a cell density increasing gradually from the region with a small thickness and a small cell density to the region with a large thickness and a large cell density, the region provided between the region with a small thickness and a small cell density and the region with a large thickness and a large cell density.

It is confirmed from an experiment that, from the effect of the injection foaming mold of this embodiment, the distortion of a surface caused by a step difference can become almost invisible particularly in exterior components characteristic of a gloss surface, such as a personal computer, a printer, and a television set.

Similarly, it is confirmed from an experiment that, even in a lifter and a slide portion for processing an undercut portion, a local step difference of a contraction difference caused by a foamed structure difference can be prevented by providing the capacity change shape portion at the boundary between the fixed core and the movable core of the present invention.

As described above, according to the configuration in which the capacity change shape portion of this embodiment is provided, a foam molding product with a suppressed stiffness decrease and an enhanced foaming ratio can be deployed with respect to exterior components having a gloss surface and components required to have flatness, using a foamable resin material and a counter pressure molding method.

The injection foaming mold according to the embodiment of the present invention is described with reference to the drawings. FIG. 1 is a cross-sectional view illustrating a basic configuration of the injection foaming mold of this embodiment. In FIG. 1, the fixed core 1 does not move in the die, and the movable core 2 moves to perform the core back.

Further, the foamed plastic product 3 is molded by injecting a resin into a space in the die. The cavity plate 4 is provided, and the core plate 5 contains the fixed core 1 and the movable core 2.

Figure 2:
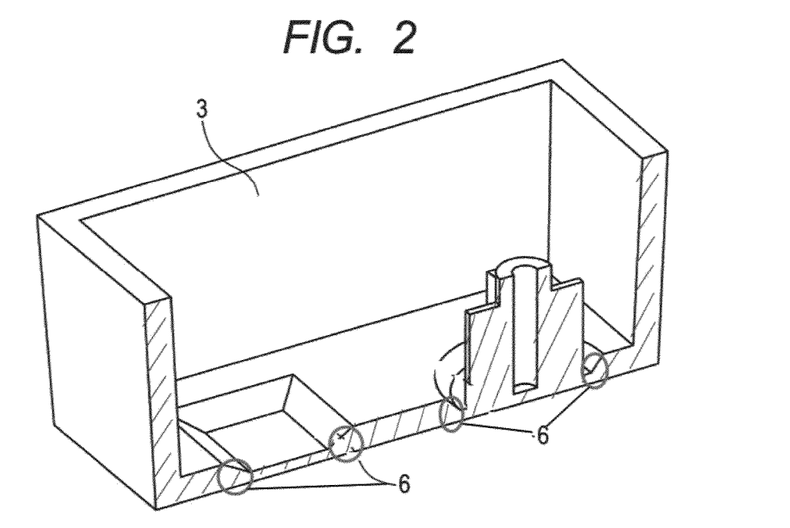
FIG. 2 is a cross-sectional view of a foamed plastic product molded by the injection foaming mold according to the embodiment of the present invention.
Figure 3:
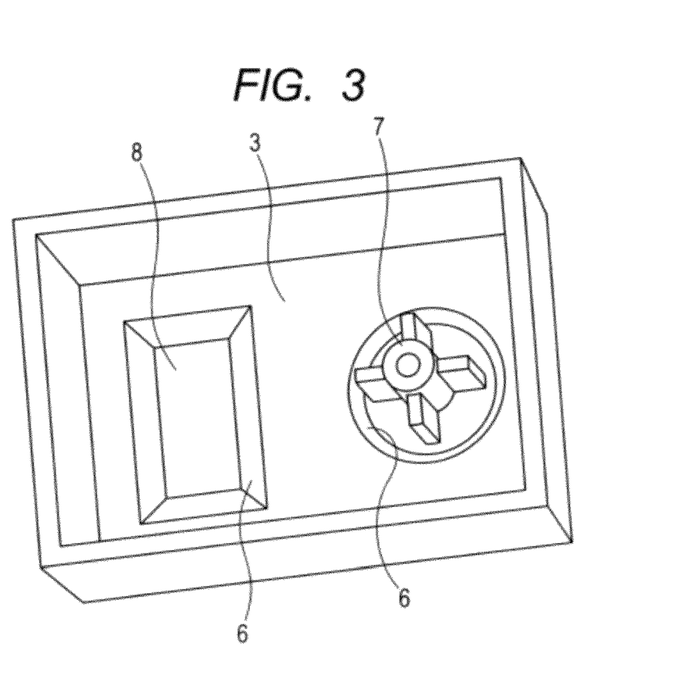
FIG. 3 is an entire view of the foamed plastic product molded by the injection foaming mold according to the embodiment of the present invention.

FIG. 2 is a cross-sectional view of the foamed plastic product molded by the injection foaming mold of this embodiment. The portion 6 is a portion having the thickness increasing gradually, which is molded by the capacity change shape portion in which the capacity is changed smoothly from the fixed core side to the movable core side, at the boundary between the fixed core and the movable core in the injection foaming mold. FIG. 3 illustrates the foamed plastic product molded by the injection foaming mold of this embodiment. A boss 7 performs self-tapping and a thin portion 8 is formed by the fixed core.

Next, a method of producing a foamed plastic product by the injection foaming mold of this embodiment is described with reference to FIGS. 4A and 4B.

In core-back injection molding using the injection foaming mold in this embodiment, a foamable resin is injected in a molten state. Then, under a state in which the foamable resin is uncured, the capacity of the die is enlarged to decrease the pressure applied to the foamable rein in an uncured state, with the result that foaming in the die is accelerated.

Figure 4A:
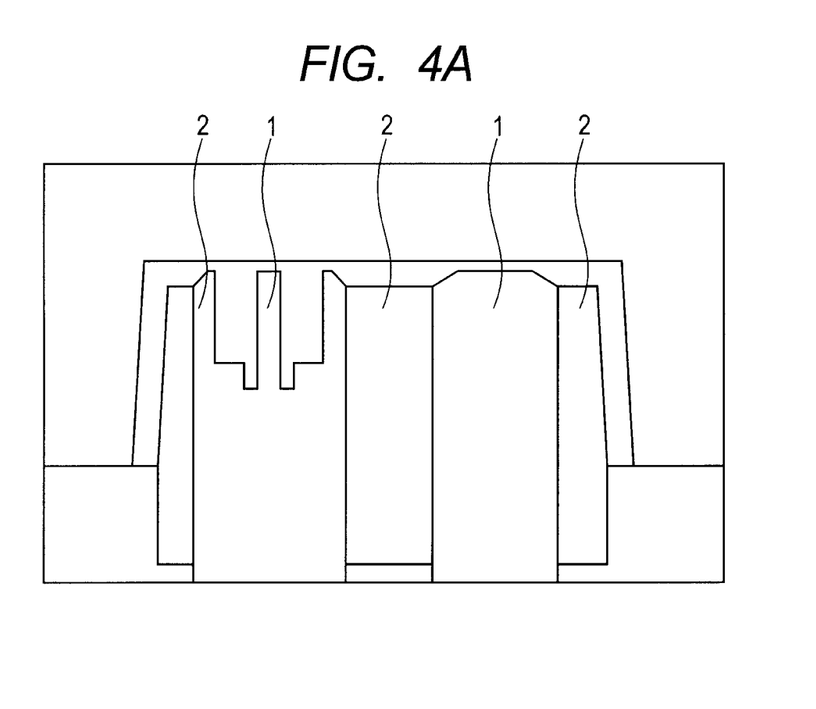
FIGS. 4A and 4B are views illustrating an operation of the injection foaming mold according to the embodiment of the present invention.
Figure 4B:
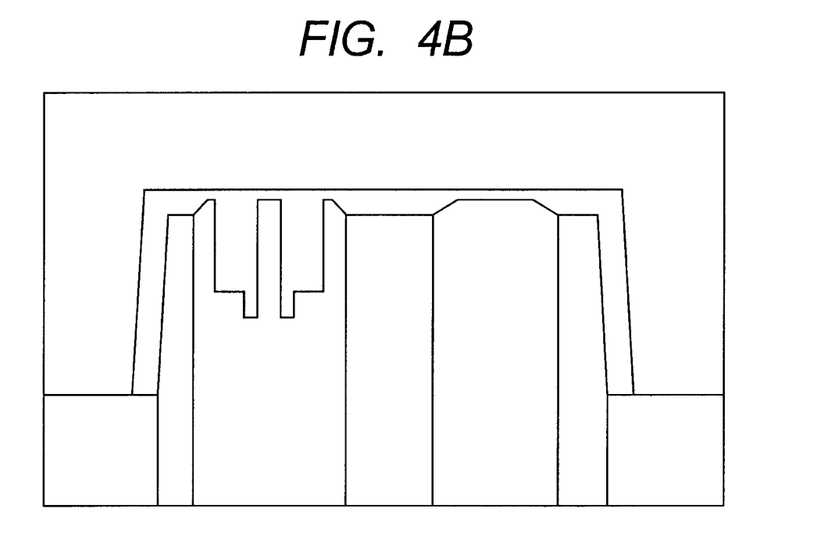

FIG. 4A illustrates the state before the core back, and FIG. 4B illustrates the state after the core back. In FIGS. 4A and 4B, for core-back injection molding, first, an injection foaming mold is prepared, which includes a fixed core that does not move and a movable core that performs the core back.

Then, the movable core 2 is allowed to stand at a position of a previously set capacity or thickness, and then a foamable resin is injected and filled into the die.

After the die is filled with the resin, the movable core 2 moves to a predetermined position, and core-back foaming is performed.

At this time, the portion in which the capacity is changed smoothly by the capacity change shape portion provided at the boundary between the fixed core and the movable core in this embodiment changes the molding product portion between the fixed core and the movable core continuously.

Figure 5:
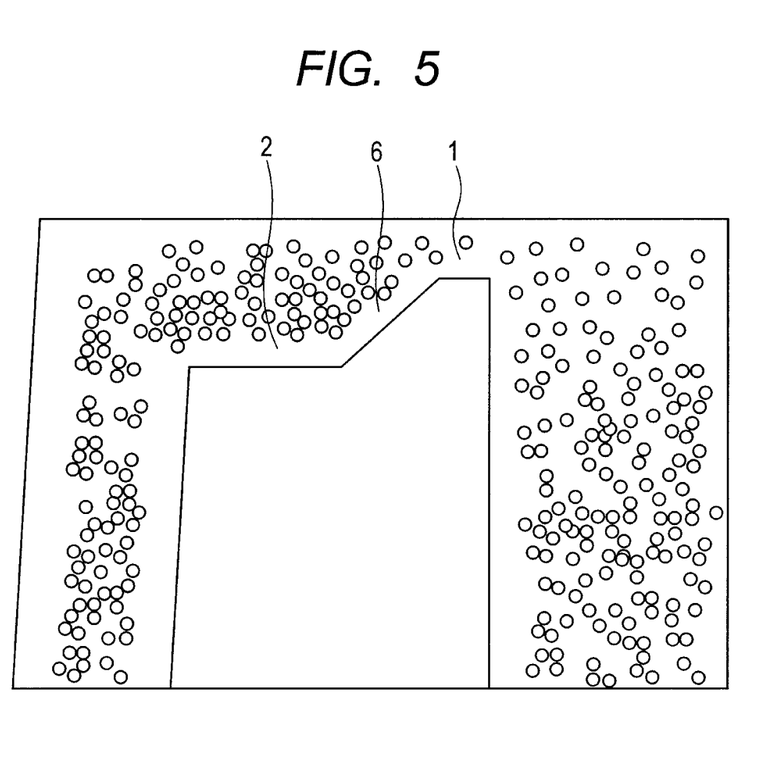
FIG. 5 is a cross-sectional view illustrating an internal structure of the foamed plastic product molded by the formed resin molding die according to the embodiment of the present invention.

FIG. 5 is a cross-sectional view illustrating an internal structure of the foamed plastic product molded by the injection foaming mold of this embodiment.

In FIG. 5, the portion 6 in which the capacity is changed smoothly corresponds to a portion having the structure changed continuously and connected by the capacity change shape portion provided at the boundary between the fixed core and the movable core of this embodiment.

As described above, by providing the capacity change shape portion molded by the injection foaming mold of this embodiment, the difference in foamed structure and remaining foaming force between the fixed core portion and the movable core portion can be connected smoothly.

That is, the difference in foamed structure and remaining foaming force between the fixed core portion in which a foaming ratio is low, the number of cells is small, and a foaming force remains and the movable core portion in which a foaming ratio is high, the number of cells is large, and an internal foaming force is almost eliminated by the core back can be connected smoothly.

Thus, it is possible to produce a foamed plastic product having a foamed structure with a cell density increasing gradually and changing continuously from the region with a small cell density to the region with a large cell density.

Next, an example of the capacity change shape portion in this embodiment is described.

FIGS. 6A to 6D illustrate exemplary shapes for creating a smooth capacity change portion for connecting the fixed core to the movable core, to which the feature configuration of the present invention in this embodiment is applied.

In FIGS. 6A to 6D, a broken line represents the position of the movable core before the core back, and in portions 9 to 12, the capacity changes smoothly in this embodiment.

Figure 6A:
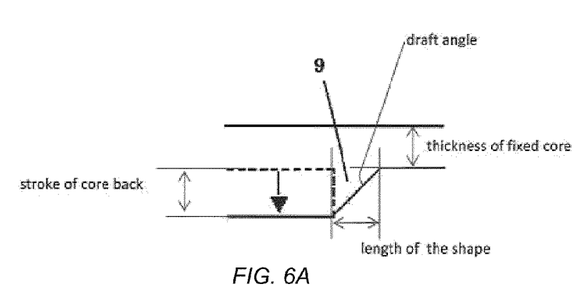
FIGS. 6A, 6B, 6C, and 6D are views illustrating exemplary shapes for creating a smooth capacity change portion for connecting a fixed core and a movable core according to the embodiment of the present invention.

FIG. 6A illustrates an example in which the capacity change shape portion with the capacity changing smoothly from the fixed core side to the movable core side is formed at the boundary between the fixed core and the movable core.

Figure 6B:
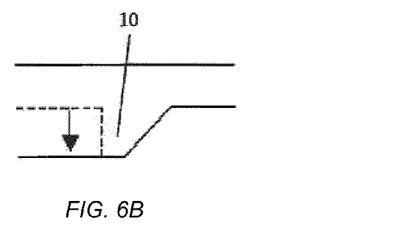

FIG. 6B illustrates an example in which a minute flat portion of about 0.5 mm to 1.0 mm is provided on the fixed core at the boundary between the fixed core and the movable core so as to enhance durability against sliding with respect to the movable core.

Figure 6C:
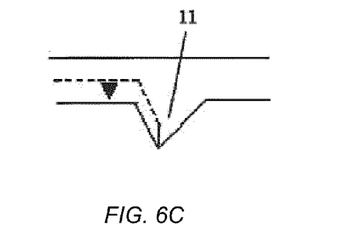
Figure 6D:
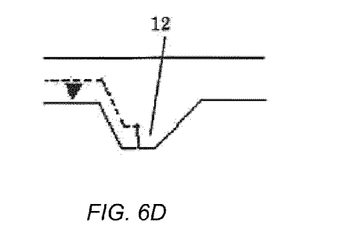

FIG. 6C illustrates an example in which a part of the smooth capacity change portion is also formed on the movable core side. FIG. 6D illustrates an example in which a part of the smooth capacity change portion is also formed on the movable core side and a minute flat portion for enhancing the durability against sliding is provided.

Needless to say, the shape in which the capacity is changed smoothly is not limited to those illustrated in FIGS. 6A to 6D.

Next, an exemplary configuration is described, in which the configuration of the above-mentioned capacity change shape portion is applied to a lifter that is not operated during the injection of a resin and the operation of the movable core and that is operated when a component is taken out.

Figure 7:
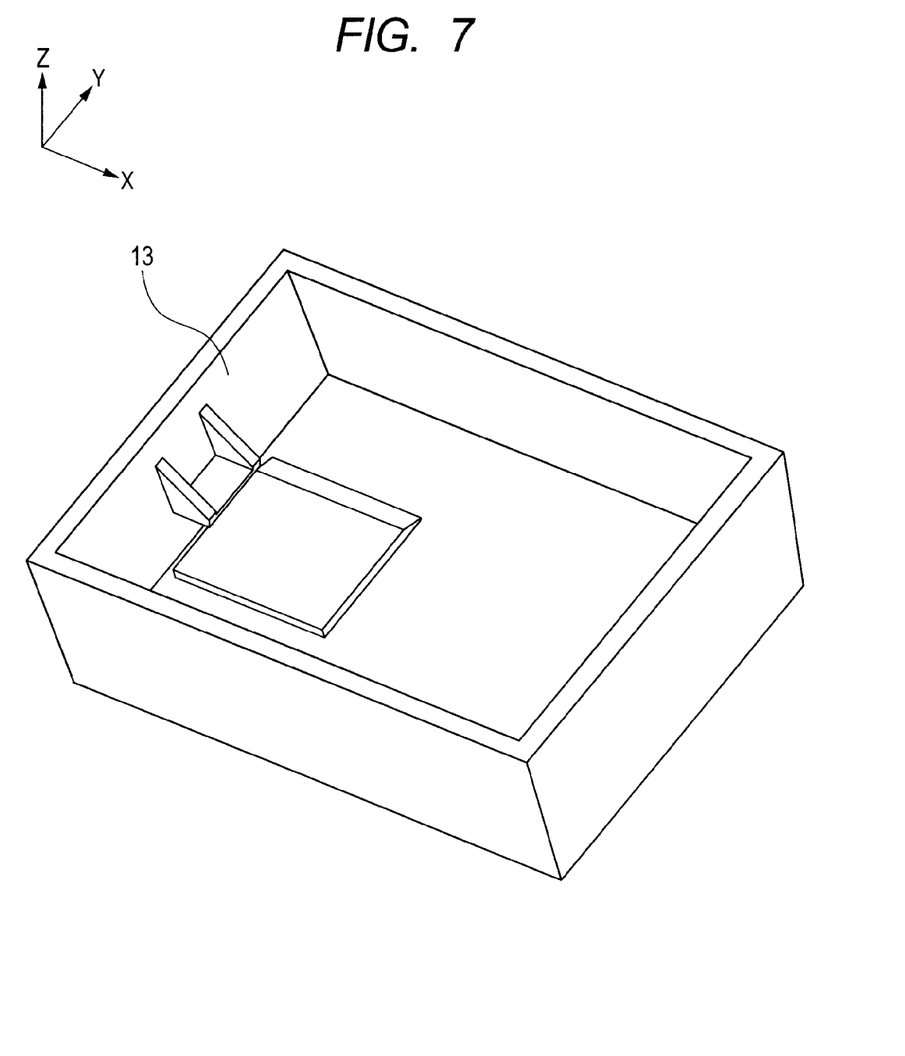
FIG. 7 is an entire view of the foamed plastic product having a lifter portion according to the embodiment of the present invention.

In FIG. 7, a foamed plastic product 13 has a lifter portion formed by applying the configuration of the above-mentioned capacity change shape portion.

Figure 8:
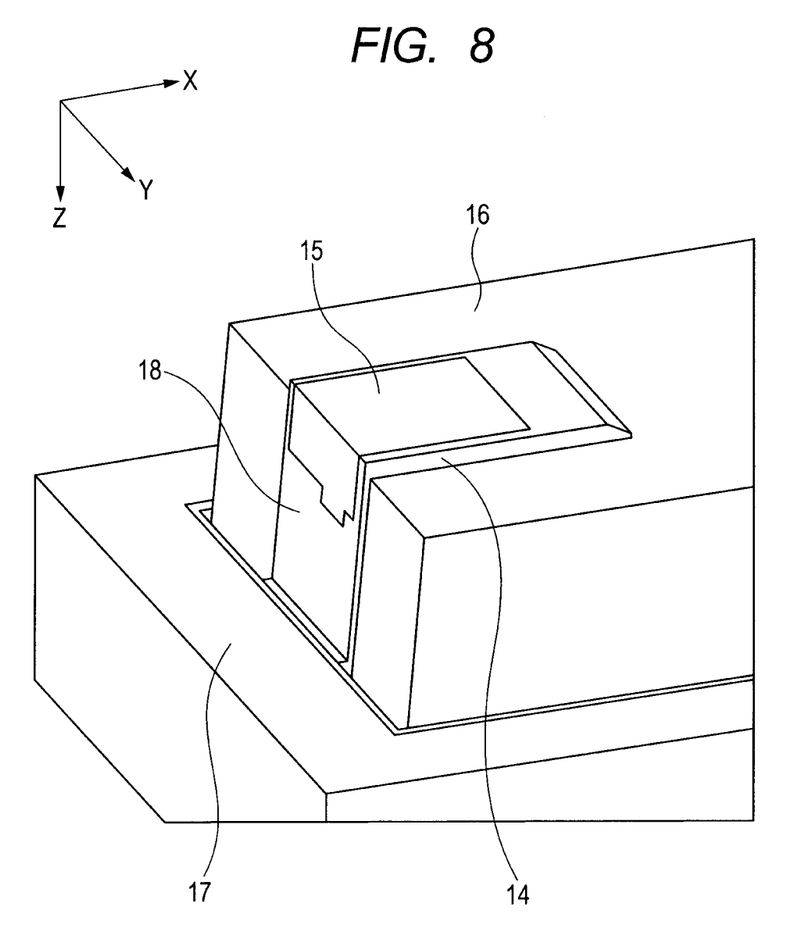
FIG. 8 is a view illustrating a core side of a die having a lifter formed by applying a configuration of a capacity change shape portion according to the embodiment of the present invention.

FIG. 8 is a view illustrating a core side of a die having a lifter formed by applying the configuration of the capacity change shape portion.

In FIG. 8, there are provided a fixed core 18, a movable core 16, a lifter 15 contained in the fixed core 18, and a core plate 17.

As illustrated in FIG. 8, a capacity change shape portion is formed, in which the capacity is changed smoothly from the fixed core side containing the lifter 15 to the movable core side.

The operation of the lifter is described with reference to FIGS. 9A and 9B.

Figure 9A:
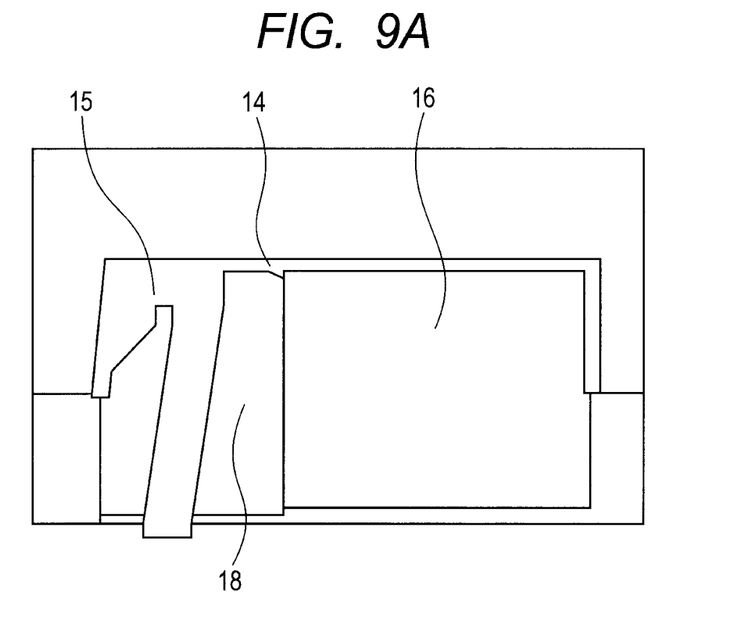
FIGS. 9A and 9B are views illustrating an operation of the lifter according to the embodiment of the present invention.
Figure 9B:
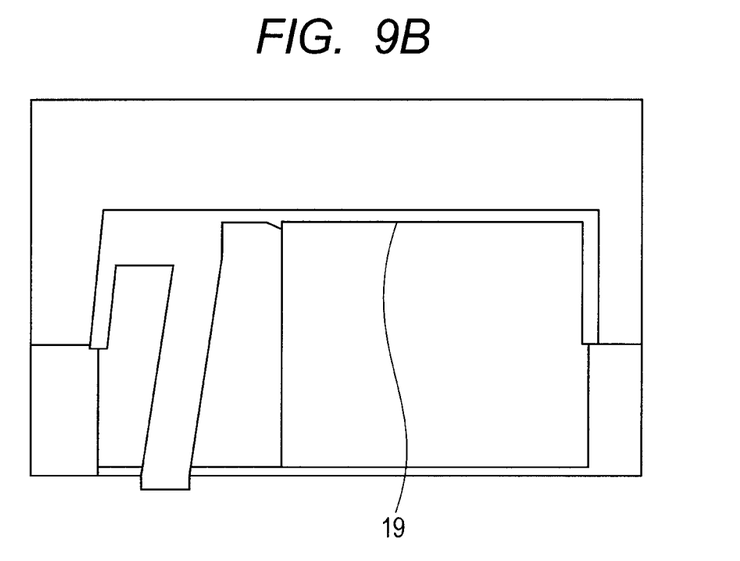

In FIGS. 9A and 9B, the fixed core 18 contains the lifter, and the movable core 16 performs the core back.

In FIGS. 9A and 9B, FIG. 9A illustrates the state before the core back, in which the movable core 16 is allowed to stand at the position of a previously set capacity or thickness, and then a foamable resin is injected and filled into the die.

After the die is filled with the resin, the movable core 16 moves to a predetermined position, and core-back foaming is performed.

At this time, a portion 14 in which the capacity is changed smoothly in this embodiment changes a molding product portion between the fixed core and the movable core continuously.

In FIG. 9B, a portion 19 is formed by the core back.

As described above, according to the injection foaming mold having the capacity change shape portion of this embodiment, the difference in foamed structure and remaining foaming force between the fixed core portion and the movable core portion can be connected smoothly, and the occurrence of a local step difference and deformation such as a sink can be prevented.

According to a core-back injection molding die in a conventional example in which the above-mentioned capacity change shape portion with a foamed structure changing smoothly and continuously is not formed at the boundary between the fixed core portion and the movable core portion, a step difference and deformation such as a sink occur.

Figure 10:
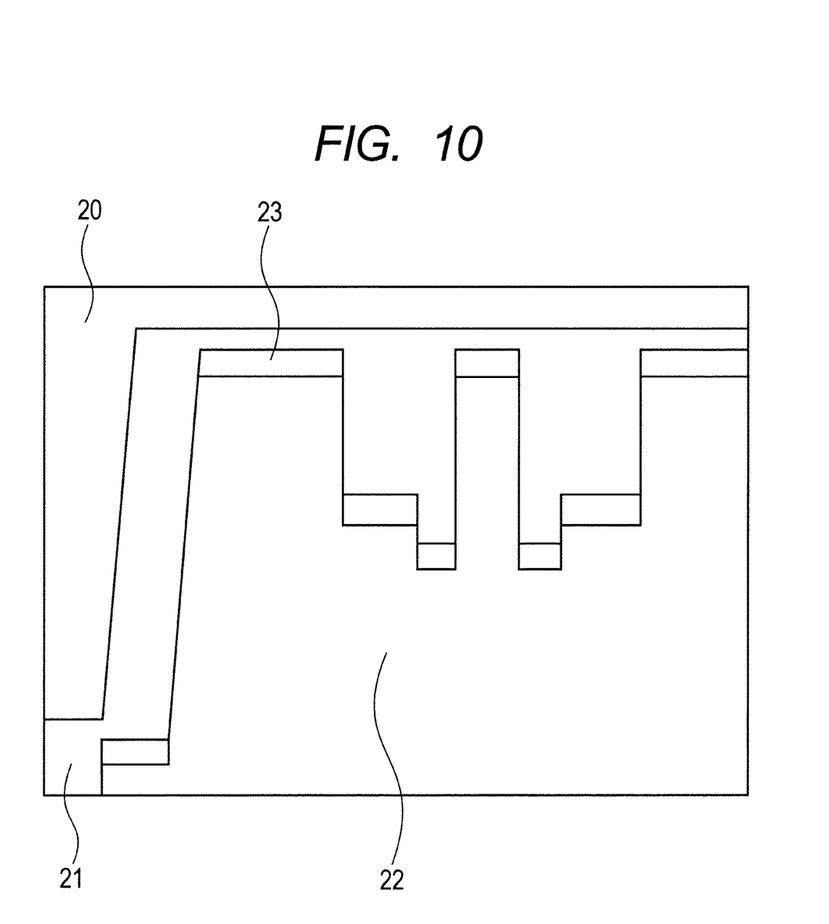
FIG. 10 is a cross-sectional view illustrating a core-back injection molding die and an operation thereof in a conventional example.

Hereinafter, further description is made. FIG. 10 is a cross-sectional view illustrating the core-back injection molding die and an operation thereof in the conventional example.

In FIG. 10, a cavity plate 20 is provided, and a core frame 21 holds a core. Further, a movable core 22 performs the core back, and a foamed portion 23 is formed by the core back.

In the case of molding with the die as illustrated in FIG. 10, there is a problem in that, because the core back is performed on the entire core side, the position precision of a boss, a rib, and an end surface illustrated in FIG. 10 is degraded.

Figure 11:
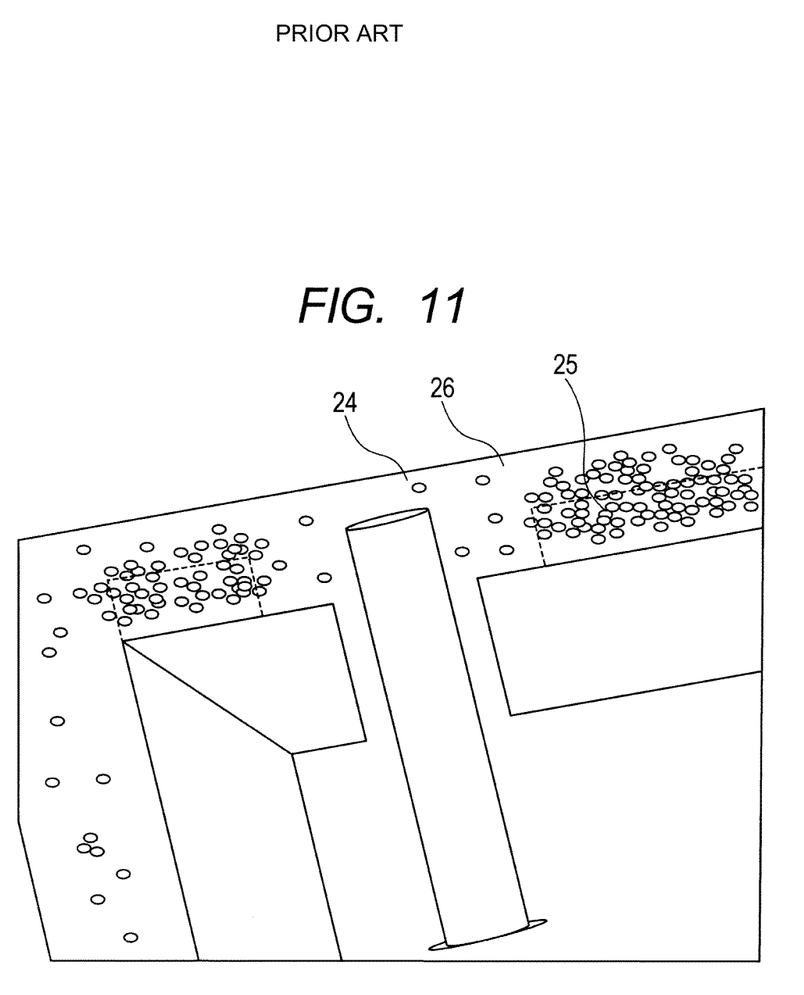
FIG. 11 is a view illustrating an example in which a boss portion is formed by a fixed core in the core-back injection molding die in the conventional example.

FIG. 11 is a view illustrating an example in which a boss portion is formed by the fixed core in the core-back injection molding die in the conventional example.

In FIG. 11, a foamed structure 24 is formed by the fixed core, and a foamed structure 25 is formed by the core back.

A boundary portion 26 is provided between the fixed core portion and the core-back portion, and due to the difference in foamed structure as illustrated in FIG. 11, a step difference and deformation similar to a sink occur in the boundary portion 26.

That is, in the case of performing the core back with the conventional die structure, if precision is partially required or a fixed core is partially required as in the case of a hole, a step difference and deformation similar to a sink may occur due to the difference in foamed structure at the boundary.

In contrast, according to the injection foaming mold of this embodiment, as illustrated in FIGS. 4A, 4B, and 5, a local step difference and deformation similar to a sink can be prevented by forming the capacity change shape portion in which the foamed structure changes smoothly and continuously at the boundary between the fixed core portion and the movable core portion.

Hereinafter, experimental examples conducted so as to confirm the results of molding with the injection foaming mold of the present invention are described.

In the following experimental examples, in the capacity change shape portion of the injection foaming mold (hereinafter, referred to as a "die") of the present invention, the region in which the capacity of the die is changed smoothly and continuously from the fixed core side to the movable core side at the boundary between the fixed core and the movable core in the die is referred to as a capacity gradually changing region. Further, an angle of a slope in the capacity gradually changing region in which the capacity is changed smoothly is referred to as a draft angle.

EXPERIMENTAL EXAMPLE 1

As Experimental Example 1, molding was performed under the following molding conditions, using a die having the capacity change shape portion of the present invention.
Resin material: PC+ABS TN7500 produced by Teijin Chemicals Ltd.
Foaming agent: supercritical nitrogen gas
Molding machine: JSW 350 Ton
Die: capacity gradually changing region at boundary between fixed core and movable core: 5.0 mm, draft angle: 16.7°
Molding resin temperature: 250° C.
Die temperature: 60° C.
Filling time: 1.5 seconds
Pressure keeping time: 0.5 seconds
Cooling time: 14 seconds
Core-back start: after completion of pressure keeping Core-back amount: 1.5 mm
Thickness before core back: 1.5 mm
Core-back time: 0.5 seconds In Experimental Example 1, as a result of perfoaming molding using the above-mentioned die under the above-mentioned molding conditions, a step difference at the boundary between the fixed core and the movable core was 0.01 mm or less, and no distortion of a gloss surface was recognized visually.

EXPERIMENTAL EXAMPLE 2

In Experimental Example 2, molding was performed by increasing the pressure keeping time from 0.5 seconds to 1.5 seconds, of the molding conditions of Experimental Example 1.

In Experimental Example 2, a step difference at the boundary between the fixed core and the movable core was 0.03 mm at maximum, and the step difference increased slightly compared with that of Experimental Example 1. However, according to visual recognition, a distortion of a gloss surface was small, which was a negligible level.

EXPERIMENTAL EXAMPLE 3

In Experimental Example 3, molding was performed by increasing the operation time of the movable core from 0.5 seconds to 2.0 seconds, of the molding conditions of Experimental Example 1.

The operation stroke was the same as that of Experimental Example 1 (i.e., 1.5 mm), which revealed that the operation speed was decreased to ¼.

In Experimental Example 3, a step difference at the boundary between the fixed core and the movable core of a molding product was 0.03 mm to 0.05 mm, and thus, the step difference increased compared with that of Experimental Example 1.

This is because curing of the fixed core portion and a skin layer proceeded, which increased the difference between the fixed core portion and the movable core portion.

Although a distortion of a gloss surface was slightly recognized visually, a required outer appearance level of the product and a required flatness value of 0.05 or less were satisfied.

EXPERIMENTAL EXAMPLE 4

In Experimental Example 4, molding was performed under the same molding conditions as those of Experimental Example 1, except for using the die in the conventional example (see FIG. 10) having no capacity change shape portion of the present invention.

In Experimental Example 4, as a result of perfoaming molding, a step difference at the boundary between the fixed core and the movable core was 0.06 mm to 0.10 mm, and the step difference on the surface was obviously recognized visually and the required flatness value of 0.05 or less was not satisfied.

EXPERIMENTAL EXAMPLE 5

As Experimental Example 5, molding was performed under the following molding conditions, using a die having the capacity change shape portion of the present invention.
Resin material: ABS VN30 produced by Asahi Kasei Chemicals
Foaming agent: supercritical nitrogen gas
Molding machine: JSW 350 Ton
Die: capacity gradually changing region at boundary between fixed core and movable core: 5.0 mm, draft angle: 16.7°
Molding resin temperature: 210° C.
Die temperature: 50° C.
Filling time: 1.5 seconds
Pressure keeping time: 0.5 seconds
Cooling time: 12 seconds
Core-back start: after completion of pressure keeping
Core-back amount: 1.5 mm
Thickness before core back: 1.5 mm
Core-back time: 0.5 seconds In Experimental Example 5, as a result of perfoaming molding by changing the resin material from PC+ABS to ABS and using the die having the capacity gradually changing region, a step difference at the boundary between the fixed core and the movable core was 0.01 mm or less, and no distortion of a gloss surface was recognized visually.

EXPERIMENTAL EXAMPLE 6

In Experimental Example 6, molding was performed by increasing the operation time of the movable core from 0.5 seconds to 1.5 seconds, of the conditions of Experimental Example 5.

In Experimental Example 6, a step difference at the boundary between the fixed core and the movable core was 0.01 mm or less, and no distortion of a gloss surface was recognized visually. Further, the required flatness value of 0.05 or less was satisfied.

EXPERIMENTAL EXAMPLE 7

As Experimental Example 7, molding was performed under the following molding conditions, using a die having the capacity change shape portion of the present invention.
Resin material: PPE+PS SABIC Innovative Plastics ZM3640
Foaming agent: supercritical nitrogen gas
Molding machine: JSW 350 Ton
Die: capacity gradually changing region at boundary between fixed core and movable core: 5.0 mm, draft angle: 16.7°
Molding resin temperature: 290° C.
Die temperature: 70° C.
Filling time: 1.5 seconds
Pressure keeping time: 0.5 seconds
Cooling time: 12 seconds
Core-back start: after completion of pressure keeping
Core-back amount: 1.5 mm
Thickness before core back: 1.5 mm
Core-back time: 0.5 seconds In Experimental Example 7, as a result of perfoaming molding by changing the resin material from PC+ABS to PPE+PS and using the die having the capacity gradually changing region, a step difference at the boundary between the fixed core and the movable core was 0.01 mm or less, and no distortion of a gloss surface was recognized visually.

EXPERIMENTAL EXAMPLE 8

In Experimental Example 8, molding was performed by increasing the operation time of the movable core from 0.5 seconds to 1.5 seconds, of the conditions of Experimental Example 7.

In Experimental Example 8, a step difference at the boundary between the fixed core and the movable core was 0.01 mm or less, and no distortion of a gloss surface was recognized visually. Further, the required flatness value of 0.05 or less was satisfied. It was revealed from the results of Experimental Examples 1 to 8 that, in the foam molding in Experimental Examples 1 to 3 and Experimental Examples 5 to 8 using the die having the capacity change shape portion of the present invention, a satisfactory flat surface was obtained even if the material and the operation speed of the movable core were changed.

Further, it was revealed that, in the foam molding in Experimental Example 4 in the conventional example using the die having no capacity change shape portion of the present invention, a step difference of 0.05 mm or more, which was recognizable visually, occurred at the boundary between the fixed core and the movable core.

Table 1 shows the results of Experimental Examples 1 to 8.

TABLE 1

| | Molding Material | Pressure keeping time sec | Operation time sec | Step difference mm | Average cell diameter (mm) | |
|---|---|---|---|---|---|---|
| | | | | | Fixed core portion | Movable core portion |
| Experimental Example 1 | PC + ABS | 0.5 | 0.5 | <0.01 | 0.03 | 0.08 |
| Experimental Example 2 | PC + ABS | 1.5 | 0.5 | <0.03 | 0.03 | 0.07 |
| Experimental Example 3 | PC + ABS | 0.5 | 2 | 0.03-0.05 | 0.03 | 0.12 |
| Experimental Example 4 | PC + ABS | 0.5 | 0.5 | 0.06-0.1 | 0.03 | 0.07 |
| Experimental Example 5 | ABS | 0.5 | 0.5 | <0.01 | 0.04 | 0.1 |
| Experimental Example 6 | ABS | 0.5 | 1.5 | <0.01 | 0.04 | 0.15 |
| Experimental Example 7 | PPE + PS | 0.5 | 0.5 | <0.01 | 0.03 | 0.05 |
| Experimental Example 8 | PPE + PS | 0.5 | 1.5 | <0.01 | 0.03 | 0.07 |

EXPERIMENTAL EXAMPLE 9

In Experimental Example 9, an experiment was conducted by changing the draft angle in the capacity gradually changing region in Experimental Example 1 from 16.7° to 30°.

In the conventional example having no capacity change shape portion, 90° corresponds to the draft angle.

In Experimental Example 9, as a result of perfoaming molding by setting the draft angle to 30°, a step difference at the boundary between the fixed core and the movable core was 0.01 mm or less, and no distortion of a gloss surface was recognized visually.

EXPERIMENTAL EXAMPLE 10

In Experimental Example 10, an experiment was conducted by changing the draft angle in the capacity gradually changing region in Experimental Example 1 from 16.7° to 45°.

In Experimental Example 10, as a result of perfoaming molding by setting the gradually changing angle to 45°, a step difference at the boundary between the fixed core and the movable core was 0.02 mm or less, and flatness and a distortion of a gloss surface according to the visual recognition were negligible levels.

EXPERIMENTAL EXAMPLE 11

In Experimental Example 11, an experiment was conducted by changing the draft angle in the capacity gradually changing region in Experimental Example 1 from 16.7° to 60°.

In Experimental Example 11, as a result of perfoaming molding by setting the gradually changing angle to 60°, a step difference at the boundary between the fixed core and the movable core was 0.07 mm at maximum, and a distortion of a surface was a visually recognizable level. Further, the flatness standard of 0.05 mm or less was not satisfied.

EXPERIMENTAL EXAMPLE 12

In Experimental Example 12, molding was performed by enlarging the capacity gradually changing region in Experimental Example 10 from 5 mm to 10 mm.

In the molding product in Experimental Example 12, a step difference at the boundary was 0.01 mm or less, and flatness and a distortion of a gloss surface according to the visual recognition were negligible levels.

EXPERIMENTAL EXAMPLE 13

In Experimental Example 13, an experiment was conducted by changing the draft angle in the capacity gradually changing region in Experimental Example 12 from 16.7° to 60°.

In the molding product in Experimental Example 13, a step difference at the boundary was 0.03 mm or less, and flatness and a distortion of a gloss surface according to the visual recognition were negligible levels.

EXPERIMENTAL EXAMPLE 14

In Experimental Example 14, an experiment was conducted by changing the draft angle in the capacity gradually changing region in Experimental Example 5 from 16.7° to 45°.

In the molding product in Experimental Example 14, a step difference at the boundary was 0.01 mm or less, and flatness and a distortion of a gloss surface according to the visual recognition were negligible levels.

EXPERIMENTAL EXAMPLE 15

In Experimental Example 15, an experiment was conducted by changing the draft angle in the capacity gradually changing region in Experimental Example 14 from 45° to 60°.

In Experimental Example 15, as a result of perfoaming molding by setting the draft angle to 60°, a step difference at the boundary between the fixed core and the movable core was 0.08 mm at maximum, and a distortion of a surface was a visually recognizable level. Further, the flatness standard of 0.05 mm or less was not satisfied.

It was found from the results of Experimental Examples 9 to 15 that, according to the present invention, satisfactory surface properties were obtained if the inclined surface had the draft angle in the capacity gradually changing region of less than 60°.

Further, regarding the capacity gradually changing region of the present invention, it was found that the effects varied depending upon the range of the capacity gradually changing region (length of the capacity gradually changing region), the draft angle, and the material.

Then, as a result of the experiments, it was found that it was desired that the following expression be satisfied in the relationship between the range of the capacity gradually changing region (length of the capacity gradually changing region) and the core-back amount (core-backs).

(stroke of core back)/(length of capacity gradually changing region)<1.73, where (stroke of core back)<(thickness of fixed core).

Because the present invention is effective with respect to the conventional technique even when the material, capacity gradually changing region, and the like are set outside of those in the experimental examples, the present invention is not limited to the range of the molding conditions shown in the experimental examples.

TABLE 2

| | Molding Material | Gradually changing region mm | Gradually changing angle Degree | Step difference mm |
|---|---|---|---|---|
| Experimental Example 9 | PC + ABS | 5 | 30 | <0.01 |
| Experimental Example 10 | PC + ABS | 5 | 45 | <0.02 |
| Experimental Example 11 | PC + ABS | 5 | 60 | 0.03-0.07 |
| Experimental Example 12 | PC + ABS | 10 | 45 | <0.01 |
| Experimental Example 13 | PC + ABS | 10 | 60 | <0.03 |
| Experimental Example 14 | ABS | 5 | 45 | <0.01 |
| Experimental Example 15 | ABS | 5 | 60 | 0.04-0.08 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-261623, filed Nov. 24, 2010, which is hereby incorporated by reference herein in its entirety.

What is claimed is:

1. An injection foaming mold suitable for use in core-back injection molding in which a foamable resin containing a foaming agent is injected into a space of the mold, and a height of the space is enlarged to accelerate foaming in the space, the injection foaming mold comprising:
a fixed core; and
a movable core,
wherein the movable core is adjacent to the fixed core and is capable of moving to a forward position where the height of the space is made smaller than the height of an enlarged space,
wherein the fixed core has a boundary portion between a portion where the height of the space is smaller than the height of the enlarged space and the movable core, and
wherein the boundary portion is inclined such that the height of the space gradually increases from the portion where the height of the space is smaller than the height of the enlarged space toward the movable core.

2. The injection foaming mold according to claim 1, wherein the shape of the boundary portion has an inclined surface with a draft angle of less than 60° to a movable core side.

3. The injection foaming mold according to claim 1, wherein the boundary portion defines a capacity gradually changing region, and the capacity gradually changing region satisfies a following expression:

(stroke of core back)/(length of capacity gradually changing region)<1.73, where (stroke of core back)<(thickness of fixed core).

4. The injection foaming mold according to claim 1, further comprising a lifter that avoids being operated when the fixed core allows the foamable resin to be injected into the space and when the movable core is operated, and that is operated when a molding product is taken out of the space.

5. The injection foaming mold according to claim 1, further comprising a slide that avoids being operated when the fixed core allows the foamable resin to be injected into the space and when the movable core is operated, and that is operated when a molding product is taken out of the space.

6. A method of producing a foamed plastic product by core-back injection molding in which a foamable resin containing a foaming agent is injected into a space of a mold, and a height of the space is enlarged to accelerate foaming in the space, the method comprising:
preparing an injection foaming mold comprising:
a fixed core; and
a movable core,
wherein the movable core is adjacent to the fixed core and is capable of moving to a forward position where the height of the space is made smaller than the height of an enlarged space,
wherein the fixed core has a boundary portion between a portion where the height of the space is smaller than the height of the enlarged space and the movable core, and
wherein the boundary portion is inclined toward the movable core such that the height of the space gradually increases from the portion where the height of the space is smaller than the height of the enlarged space toward the movable core;
previously setting the movable core at the forward position, and injecting the foamable resin containing the foaming agent into the space; and
under a state in which the foamable resin is uncured, moving the movable core to a position at which the enlarged space is achieved and reducing the kept pressure to accelerate foaming in the space, to thereby obtain the foamed plastic product.

* * * * *